United States Patent [19]
McCreary et al.

[11] Patent Number: 5,384,566
[45] Date of Patent: Jan. 24, 1995

[54] LOAD SHARING SYSTEM FOR COMPUTER NETWORK PROTOCOLS

[75] Inventors: Dann P. McCreary; Philip J. Duclos, both of Escondido; Daniel P. Drogichen, Leucadia, all of Calif.

[73] Assignee: Integrated Networks Corporation, Bern, Switzerland

[21] Appl. No.: 776,573

[22] Filed: Oct. 15, 1991

[51] Int. Cl.⁶ .............................................. H04Q 3/00
[52] U.S. Cl. ........................... 340/825.05; 340/825.08
[58] Field of Search ..................... 340/825.05, 825.08, 340/825.52, 825.65; 370/85.5, 85.13, 85.14, 85.15, 94.1

[56] References Cited

U.S. PATENT DOCUMENTS

| | | | |
|---|---|---|---|
| Re. 31,852 | 3/1985 | Soderblom | 370/85.5 |
| 3,633,169 | 1/1972 | Bickford | 370/85.15 |
| 4,621,362 | 11/1986 | Sy | 370/85.14 |
| 4,709,365 | 11/1987 | Beale et al. | 371/11 |
| 4,922,244 | 5/1990 | Hullett et al. | 340/825.05 |
| 5,218,604 | 6/1993 | Sosnosky | 340/825.05 |

OTHER PUBLICATIONS

Ron Wilson, Senior Editor, Integrated Circuits: Silicon and Software Unite to Open FDDI Bottlenecks, Computer Design, Sep. 1, 1989.

Karen Parker, FDDI Implementations Issues, FOC/LAN 89, Track II, Session 3, Nov. 1, 1989.

Karen Parker, Designing an FDDI Network to Maximize Network Availability, Wescon 89, Session 27, Nov. 16, 1989.

Karen Parker and Steve Kaufman, Fiber-Optic Links Hold the Key to the Fast LANs of the Future, Design Applications, Electronic Design, Dec. 14, 1989.

Karen R. Parker, Techniques to Increase FDDI Station Throughput, Systems Design and Networks Conference, 1990.

Primary Examiner—Donald J. Yusko
Assistant Examiner—Edwin C. Holloway, III
Attorney, Agent, or Firm—Nydegger & Associates

[57] ABSTRACT

A device for attaching a host or network in data communications with a ring-topology network includes a plurality of contiguous stations which are independently attached in series to the ring-topology network. Each station has the ability to selectively receive data which is not received by the other stations in the device, and each station has the ability to coordinate its receipt of data with the other stations to insure that essentially all data is received by the device.

12 Claims, 3 Drawing Sheets

RECEIVE STATE TABLE FOR n NOTES

5,384,566

LOAD SHARING SYSTEM FOR COMPUTER NETWORK PROTOCOLS

FIELD OF THE INVENTION

The present invention pertains to data communications equipment. More particularly, the present invention pertains to devices which link data communications networks to each other. The present invention is particularly, but not exclusively, useful for increasing the effective bandwidth of the data that can be received from a ring-topology network.

BACKGROUND OF THE INVENTION

With the increased use of data communications equipment for the transfer of data between distant points, ring-topology networks have become an important and widely used class of data communications networks. Familiar examples of ring-topology networks include the ISO 8802-5 (1989) Token Ring Network and the ANSI X3.139-1987 Fiber Distributed Data Interface (FDDI) network. As is well known, these and any other ring-topology networks provide a common communications path over which data is sequentially passed between various stations that are attached to the ring. Optimally, each station on the ring should be able to effectively receive all data from the ring that is properly addressed to that particular station. To do this, however, it is necessary there be an effective connection between the station and the ring. This implies that the bandwidth capacity at the station be compatible with the bandwidth capacity of the network. Indeed, it is normally the case that the ability of any single station to effectively receive data is significantly less than the capacity of the network for carrying the data.

An obvious solution to this problem is to manufacture a single high-capacity node for each station on the ring which has substantially the same bandwidth capacity as the ring network. This, however, can be a very expensive proposition and may not always be practical. Consequently, an alternative to a high-capacity node for connecting stations in data communications with a ring-topology network is desirable.

In light of the above, it is an object of the present invention to provide a system for connecting a host or network in data communications with a ring-topology network which is able to combine the individual capacities of at least two stations to establish a bandwidth capacity for the host which is effectively equivalent to the bandwidth capacity of the ring-topology network. Another object of the present invention is to provide a system for connecting a host or network having a ring topology in data communications with another ring-topology network which can effectively establish a bridge between the two ring-topology networks. Still another object of the present invention is to provide a system for connecting a host or network in data communications with a ring-topology network which coordinates the operation of several stations in order to receive an aggregate data bandwidth load at the host which is greater than any of the capacities of the individual stations. Yet another object of the present invention is to provide a system for connecting high capacity equipment, such as a mainframe computer, with a ring-topology network. Another object of the present invention is to provide a means for connecting a host or network with a ring-topology network which will provide for a gradual, rather than a catastrophic, reduction in the bandwidth capacity of the stations connected to the network. It is yet another object of the present invention to provide a system for connecting a host or network to a ring-topology network which is relatively simple to manufacture, is easy to use, and is comparatively cost effective.

SUMMARY OF THE INVENTION

A device for attaching a host or network in data communications with a ring-topology network includes a plurality of stations which are individually connected to the ring. As contemplated by the present invention, the stations in the device are consecutively sequenced to cooperate with each other in the extraction of data from the ring-topology network. There are, however, no interconnections between the individual stations other than through the ring-topology network itself. Also, there is no additional message traffic between the stations other than what is normally carried over the ring-topology network. With this in mind, each station has the capability of being in either a positive or a negative receive state which is sequenced to selectively receive portions of data from the network ring. Further, each station includes a control modulo counter to coordinate its receipt of portions of data from the ring network with the receipt of the remaining portions of data by other stations in the device. The stations of the device are consecutively connected in sequence on the ring, and each station is operatively responsive to information in the individual frames of data which circulate in series along the ring.

In the operation of the device, all frames of data which are circulated on the ring-topology network are sequentially received by the individual stations of the device. Upon receipt of a frame, each station individually determines whether the frame is a proper type frame and whether the frame is properly addressed to the host or network which is serviced by the station. If either answer is no, the station ignores the frame. On the other hand, if the answers are yes the station then checks its receive state.

When in a positive receive state, the frame is copied at the station and the station ascertains whether the frame has been previously copied by any other upstream station in the device. If the frame has been previously copied, the frame is discarded by the station. The station then awaits receipt of the next frame. If the frame has not been previously copied by an upstream station in the device, the station checks the validity of the frame.

For the alternative course of action wherein the particular station in is in a negative receive state, the frame is not copied and, instead, the station moves immediately to check the validity of the frame. If the frame is valid, a modulo counter is sequenced to affect the receive state of the station.

The modulo counter is sequenced by all properly addressed valid frames, regardless of the receive state of the station, except when the frame is copied and has been previously copied by an upstream station. For normal operation, if there are n number of stations in the device, the counter will count modulo n to maintain the particular station in a negative receive state until n−1 frames have been received by the station. The modulo counter will then return the station to a positive receive state for the nth frame. In any event, once the counter has been activated by a valid frame, the frame is copied or stripped from the network. Importantly, the above stated sequence is accomplished by each station in the device for each and every frame that circulates on the ring-topology network.

Additionally, in the event a station fails in the device, the cognizant entity, i.e. the host or network, sends notice of this event to other stations in the device. This notice effectively changes the number of stations with which the remaining stations must coordinate. Stated differently, the number of stations (n), which the counters at the operative stations use for establishing an operative station's receive state, is changed to equal the total number of stations in the device minus the number of inoperative stations. Thus, as long as there is an operative station in the device, the device will continue to operate. This allows for a gradual reduction in receiving capacity by the device rather than a catastrophic failure.

The novel features of this invention, as well as the invention itself, both as to its structure and its operation will be best understood from the accompanying drawings, taken in conjunction with the accompanying description, in which similar reference characters refer to similar parts, and in which:

DESCRIPTION OF THE PREFERRED EMBODIMENTS

Figure 1:
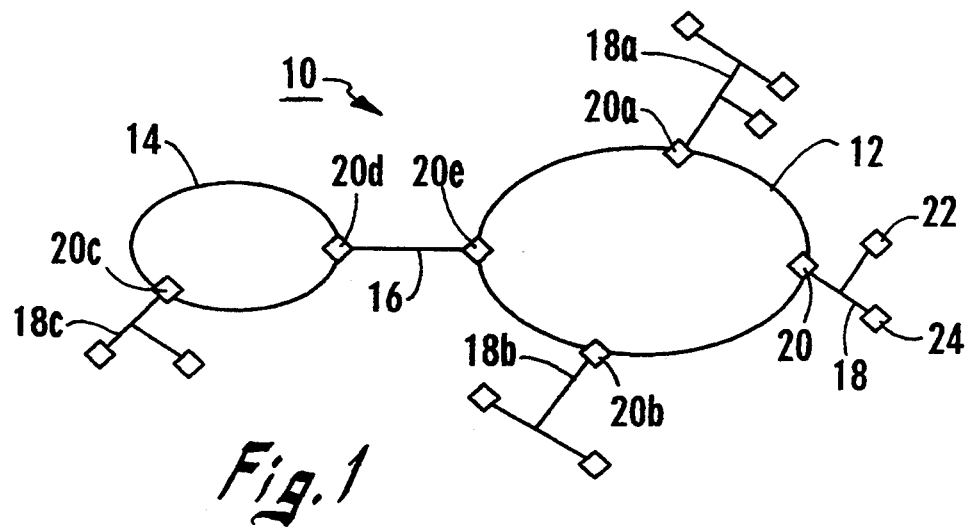
FIG. 1 is a schematic drawing of a pair of ring-topology networks which are interconnected with each other, and with peripheral stations, through the station system of the present invention.

Referring initially to FIG. 1 a communications network, generally designated 10, is shown to include a ring-topology network 12 which is connected with a second ring-topology network 14 via a bridge 16. As will be appreciated by the skilled artisan, the ring-topology networks 12, 14 can be of any type well known in the art, such as an ISO 8802-5 (1989) Token Ring Network or an ANSI X3.19-1987 Fiber Distributed Data Interface (FDDI). As shown, the bridge 16 and various networks 18 (and 18a, 18b, and 18c) are connected to the ring-topology networks 12, 14 by associated devices 20 (and 20a, 20b, and 20c). Using the network 18 as an example, data transmissions between facilities in the network 18, and facilities at other networks which are attached to the ring-topology networks 12, 14, are possible due to the associated devices 20 which connect the hosts or networks 18 to the ring-topology networks 12, 14. Though not shown, it is to be appreciated that computers, telephones, telex machines, computer workstations and video terminals are exemplary of the communications facilities 22, 24 and other facilities in the hosts or networks 18.

Figure 2B:
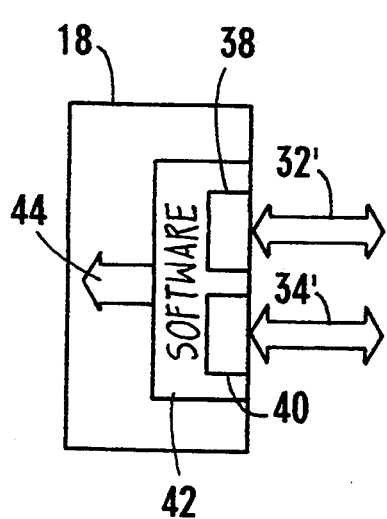
FIG. 2B is a schematic diagram of a host or network which can be operatively connected to a device of the present invention.
Figure 2A:
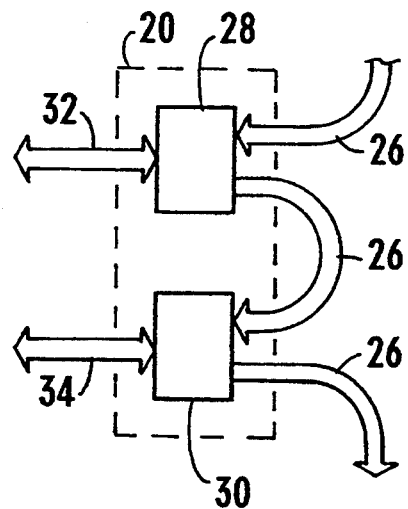
FIG. 2A is a schematic drawing of a device and the relative cooperation between a pair of stations in the device with a ring-topology network.

FIG. 2A conceptually shows a device 20 connected to a data stream 26 which is carried on the ring-topology network 12 and which may be destined for a communications facility 22 or 24 at the network 18. As shown in FIG. 2A, device 20 sequentially receives the data stream 26 from ring-topology network 12 via a station 28 and a station 30. For purposes of discussion, only stations 28 and 30 are shown. It is to be appreciated, however, that device 20 is only exemplary and more than two stations may be included in the device 20 to connect the network 18 with the ring-topology network 12. FIG. 2A also shows that the stations 28, 30 are serially connected to the data stream 26. Consequently, when positioned as shown, data circulating on ring-topology network 12 will pass first through upstream station 28 and then through downstream station 30. It should be noted that the connections between data stream 26 and the stations 28, 30 are nothing more than normal network connections.

In the present invention, the plurality of stations 28, 30 which comprise the device 20 are all connected to the ring 12 contiguously. In other words, in the ring topology 12, every station in the device 20 is adjacent to at least one other station of the device 20. Also, there are no foreign stations included within the contiguous set of member stations.

As indicated in FIG. 2A the data stream 26 for ring topology 12 has an implicit direction of data travel. This direction of travel is such that data in data stream 26 will arrive first at one end of the group of stations in the device 20. The first station to receive data is referred to as the upstream station (e.g. station 28). The last station of the device 20 to receive data is referred to as the downstream station (e.g. station 30). Each of the stations 28 and 30, however, should initially be considered separately.

Consider station 28 of device 20. As data arrives at the device 20, it is first received at the station 28, since it is the upstream station. As appreciated by the present invention, the capacity of station 28 to receive data may be significantly less than the ability of the ring-topology network 12 to circulate data in the data stream 26. This is so, for several reasons. One reason is that station 28 can have a relatively limited buffer capacity. Another reason is that certain losses are inherent in the operation of the station 28. When considering both stations 28 and 30 at device 20, however, it is be understood that the combined capacity of the stations 28, 30 to receive and copy data from the data stream 26 together is cumulative. Accordingly, by using a plurality of stations, the data stream which can be effectively received and copied at the device 20 for further transmission to facilities 22, 24 in the network 18 can be made substantially, or nearly, equal to the data stream 26 which circulates on the ring-topology network 12. More specifically, by sharing the task of copying data from data stream 26, the stations 28, 30 will respectively generate data streams 32, 34 which together contain the data in data stream 26.

Although the device 20 can effectively split the data stream 26 into a plurality of individual data streams 32, 34, the separate networks 18 must, of course, reconstitute the data stream 26. To do this, the data streams 32, 34 which are respectively generated by the stations 28, 30 at device 20 can be directed into connectors 38 and 40 at the network 18. FIG. 2B conceptually shows the data streams 32' and 34' as they will arrive at the host or network 18. Through the use of software 42 at the network 18, which can be generated by one skilled in the pertinent art to contain the necessary logic, network 18 is able to recompile and reconstitute the data in data streams 32' and 34' into a data stream 44. Data stream 44 is then effectively equivalent to the data stream 26 which circulates on the ring network 12.

As indicated above, the device 20 can be effectively used in the establishment of a bridge 16 between the ring networks 12, 14. Actually, two devices 20 are needed to establish a bridge 16 and they must be arranged in a back-to-back configuration. Why this is so requires a consideration of the two way flow of data through a device 20.

Up to this point, the case considered has been one in which data is received by the device 20 from the data stream 26. As discussed above, when data is being received, the two stations 28, 30 at device 20 effectively bifurcate the data stream 26 into the two data streams 32 and 34. For the case wherein data is to be transmitted from the device 20 it happens that either station 28 or station 30 can transmit into the data stream 26. Specifically, station 28 will transmit data from data stream 32 into the data stream 26, and station 30 will transmit data from data stream 34 into the data stream 26. Consequently, by using two devices 20 which have their respective data streams (channels) 32 connected to each other, and which have their respective data streams (channels) 34 connected to each other, the two devices 20 will effectively establish a bridge 16.

It should also be mentioned that a host or network 18 can transmit into data stream 26 through either station 28 or station 30 depending on the particular attachment desired. This transmission, however, must account for the fact that, data which are originated by the upstream station or any other station but the downstream station must pass through other stations in the device 20 before proceeding to their destination outside of the device 20 and elsewhere on the ring networks 12, 14. Thus, the logic established for any downstream station (i.e. station 30 in the two station device 20) will be such that it does not strip data from the data stream 26 that is being transmitted into the data stream 26 from the device 20. This is particularly important in the case of a bridge 16, where it is known that both the upstream station 28 and the downstream station 30 will be transmitting portions of the same data into the data stream 26.

Figures 3, 5:
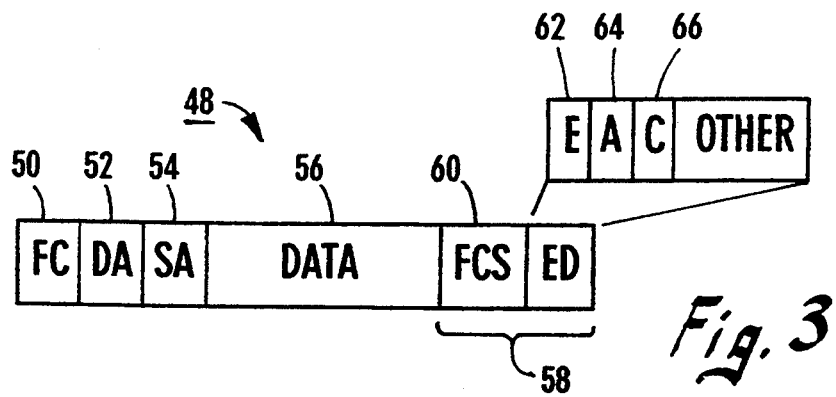
FIG. 3 is a representative schematic drawing of the contents of a data frame which is circulated on a ring-topology network between stations attached to the network.
FIG. 5 is a table showing the cooperative action for the receive state of n number of stations at a particular device in the system of the present invention.

During the operation of a ring-topology network 12, 14, whenever a network 18 has data to be communicated on the ring networks 12, 14, and when allowed by the particular protocol to do so, the network 18 will transmit its data in bit-serial form. A typical format for this data transmission is illustrated conceptually for the data frame, generally designated 48, which is shown in FIG. 3. Actually, a complete message will be divided into parts and will, therefore, normally include many frames 48.

Following the referenced standards, the network addresses for the source of the data and the destination of the data are presented at the beginning of a frame 48. Specifically, each frame 48 begins with a frame control field 50 which is followed by a destination address (DA) field 52 and source address (SA) field 54. The actual data to be transmitted is then placed in the data field 56 immediately following the addresses. Various medium access control (MAC) information is carried by the frame 48 in the frame status 58 located at the end of the frame 48. Included in the MAC field 58 is a frame check sequence 60 which is followed by an error (E) field 62, an address recognized field 64 and a frame copied field 66. In addition to serving certain network management functions, the MAC field 58 also provides information which can be used by the transmitting station 18, identified in the SA field 54, to determine if retransmission of the frame 48 is appropriate.

As is well known for the typical operation of a ring-topology network 12, 14, the transmission of data between networks 18 is accomplished by circulating frames 48 over the network 12, 14. Every transmitted frame is received, in turn, by stations 28, 30 at every device 20 on the network 12, 14, and in order for a particular station 28, 30 to determine whether to copy or ignore the entirety of a frame 48, the DA field 52 at the beginning of the frame 48 is examined. Thus, during a circuit, none, one, or several of the devices 20 on the ring-topology networks 12, 14 can copy the frame 48 and transmit the data field 56 to facilities 22, 24 which are located at the network 18. After receipt of the frame 48, and possible copy, the frame 48 is forwarded on the network 12, 14. As implied above, this occurs at each device 20 on the network 12, 14 until the frame 48 returns to the particular network 18 from which it was originally transmitted. There it will be stripped.

It can be appreciated that if all stations in the device 20 were to strip frames 48 recognized as having the device Source Address 54, only frames 48 originated by the downstream station 30 would reach the rest of the network 12. Therefore, in this invention, the upstream station 28 and only the upstream station 28 is configured to strip frames originated by itself or by any other station of the device 20. Nonetheless, all stations in the device 20 recognize the device Source Address 54 within a frame 48 for the purpose of rejecting and not copying frames 48 which were originated by the device 20, even though such frames 48 may be addressed to a public or group address which the station would otherwise receive.

For the present invention, as noted above, the bandwidth carried on a ring-topology network typically exceeds the ability of a station on the network to receive the data. This is so primarily because stations are connected to the network through only one relatively low bandwidth node. Consequently, the present invention is concerned with providing a plurality of stations at each device 20 which will act in concert to increase the data receiving capability of the device 20. Specifically, the increase at a network 18 is to a level that is effectively equivalent to the data bandwidth of the network 12, 14. To accomplish this, each station 28, 30 at a device 20 still receives each frame 48 and, importantly, each station 28, 30 can interrogate each frame 48 in the same manner. The result is that, rather than have each station 28, 30 separately copy each frame 48, a scheme is established whereby the stations 28, 30 effectively alternate copying of the frames 48 to increase the real-time reception capacity of the device 20.

Figure 4:
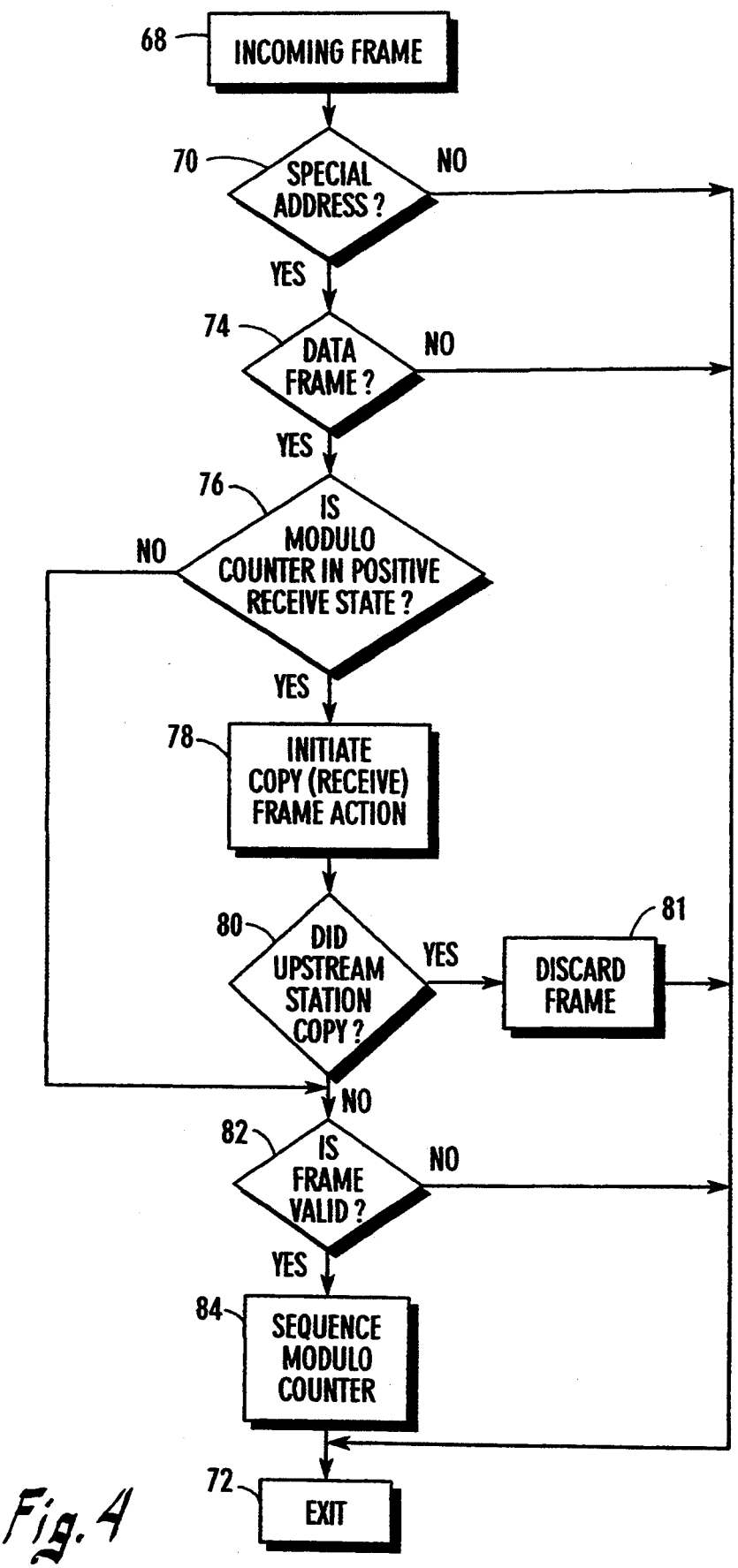
FIG. 4 is a logic flow chart of the actions and decision points taken by a station in the system of the present invention upon receipt of an individual data frame from the ring-topology network.

The interrogation of each frame 48 by each individual station 28, 30 at a device 20 is shown in the logic flow chart set forth in FIG. 4. There, as indicated by the block 68, the interrogation of a frame 48 begins when the frame 48 is received at the particular station. Decision block 70 then indicates that the destination address field 52 of frame 48 is read at the receiving station to determine whether the frame 48 is destined for a facility 22, 24 at network 18. If the frame 48 is not addressed to a facility 22, 24 at the network 18, the station proceeds to execute the exit function at action block 72 and release frame 48 back onto the ring-topology network 12, 14. On the other hand, if frame 48 is destined for a particular facility at network 18, it is examined for proper type. Again, alternate actions are possible. For an improper type frame 48, the exit function at action block 72 is followed and the frame 48 is released onto the network 12, 14. Otherwise, for an appropriately addressed proper type frame 48, the receive state of the station 28, 30 is checked.

It is of particular importance to the operation of the present invention that each station 28, 30 include the capability of being able to distinguish between a "yes" (positive) and a "no" (negative) receive state. If the receive state for the station is "yes", then action block 78 is executed at the station 28, 30 and the entirety of frame 48, to include data field 56 and MAC field 58, is copied for the network 18. After copying frame 48, the determination is next made at decision block 80 as to whether an upstream station has already copied the frame 48.

If frame 48 was not copied by an upstream station, decision block 82 indicates that the validity of frame 48 is checked. For invalid frames 48, the exit function at action block 72 is accomplished. Valid frames 48, however, now cause another important function of the present invention to be accomplished. This function is to sequence a modulo counter and, as appropriate change the receive state of the station 28, 30 whereby the receive state of the station at decision block 76 is changed to "no". Depending on the number of stations in the device 20 (e.g. n stations) the modulo counter for this station will count modulo n, and the receive state at decision block 76 will remain "no" for the receipt of the next n−1 frames 48. However, after the station has received n−1 frames 48, the receive state at decision block 76 will be changed back to a "yes" state for receipt of the nth frame 48.

If frame 48 was previously copied by an upstream station, the frame 48 is discarded as indicated by function block 81 and the exit function at action block 72 is executed. Importantly, when this happens the function for changing the receive state of the station is bypassed and the receive state of the station is not changed and, instead, remains "yes". It happens that the receive state will remain "yes" until the station determines that no upstream station has previously copied the frame 48. When there has been no previous copying of the frame 48 at the device 20, the receive state at the station will then be changed to "no" and the modulo counter will begin its count with the same changes at the decision block 76 as discussed above.

Upon receipt of the nth frame 48, at a station, the decision block 76 will have a receive state "yes" and will consequently take action at block 78 to copy the frame 48. Further action is taken as indicated in FIG. 4 and finally, block 84 is executed to reset the modulo counter for a count of modulo n. At the same time, the receive state of the station is returned to "no".

It is to be noted that as long as the receive state is "no" at the decision block 76, the station does not copy the frame 48. It does, however, check the validity of the frame 48 at decision block 82 and move toward changing the receive state through the block 84 by sequencing the modulo counter.

OPERATION

As an example of the operation of a station under the disclosed system for the present invention, consider three stations which are contiguously and serially attached to the ring-topology network 12 at the same device 20. Further, consider the first station (i.e. upstream station) as being the first to receive a frame 48, and the third station (i.e. the furthest downstream station) as being the last.

Referring now to FIG. 5, it is assumed that each station at the device 20 is initially in a "no" receive state, which is indicated by $N_{(1)}$ in FIG. 5. Consequently, the initial frame 48 to arrive at device 20 with the appropriate address will not be copied by any of the stations. Each station, however, will act from decision block 76 directly through blocks 82 and 84 to change its receive state to "yes", indicated by Y in FIG. 5. Thus, for this example, all stations are now Y. The reception of data at station 18 will actually begin, however, whenever at least one station is Y. For our example, all stations are set to Y by an initiating frame 48. Thus, though the initiating frame 48 is lost, when the first frame 48 following this initiating frame arrives at the device 20, all stations are Y.

For this example, all stations will copy the first frame 48. The first station will also change back to $N_{(2)}$, and because the modulo counter at each station is programmed for n stations, the counter at the first station will also be set to begin its modulo count from $n-1$ (=2). On the other hand, although the second and third stations will also copy this first frame 48, they will discard this frame after noting that it had been previously copied by an upstream station, i.e. the first station. Accordingly, the decision block 80 at the duplicate second and third stations will move to execute the exit function at block 72 without changing their receive state. Stated differently, the second and third stations will remain Y.

Upon the arrival of the second frame 48 which is to be copied by device 20 at network 18, the receive state of the first station will, of course, be $N_{(2)}$. As indicated above, the receive state of the second station will still be Y and it will therefore copy the frame 48. Further, the second station will notice that the frame was not copied by an upstream station, i.e. the first station. Thus, block 84 will be activated to change the receive state of the second station to $N_{(2)}$ and set its modulo counter to begin a count from $n-1$ (=2). The third station will also copy the second frame 48 but, by noticing at its decision block 80 that the frame 48 was previously copied by an upstream station (i.e. second station), the receive state for the third station will remain Y.

As the third frame 48 to be copied arrives at the station 18, the receive state for both the first and second stations are N. Only the third station remains Y, and it will copy the frame 48. Also, because neither the first nor the second station had copied the frame 48, the third station will change its receive state to $N_{(2)}$ and set its associated modulo counter to begin a count. Because this third frame had also passed through the first station and the second station, their respective counters were activated. The result then, after the third frame 48 has passed through the station 18, is that the first station now has a Y receive state and both the second and third stations have N receive states. This process continues as long as appropriately addressed frames 48 are received at the station 18.

In the "start of day" example given above, only the initiating frame was lost. It happens, however, that frames may also be lost during the transmission of a message. Unfortunately, such errors occur rather routinely in typical data communications networks, but their occurrence is at a low probability. When an error does occur, however, the stations of the device 20 will get out of synch and the device 20 needs to recover to normal operation as soon as possible.

The referenced standards contemplate the loss of an occasional frame, and the networks 12, 14 are therefore designed to handle such a loss. This is typically done by higher-level network protocols such as ISO 8802-2 (1989), "Logical Link Control". The device 20 of the present invention also contemplates such a loss and, indeed, relies for its operation on the ability to lose an occasional frame. As will be appreciated by the skilled artisan, the device 20 will recognize an error, such as a lost frame, as being equivalent to the "start of day" case. In the worst case scenario (i.e. where the most upstream station loses the frame) there will be no more than $n-1$ frames lost in the transmission. In all cases where a frame is lost, to include the "start of day" case, the system must rely on higher protocol levels to provide reliable end-to-end communications.

A simpler example involves only two stations. For this simpler case, the two stations will effectively alternate copying the frames 48 that arrive at the device 20. For instance, if the first station copies the first frame 48, it will change its receive state to N for receipt of the second frame 48. The second station will then, if it is in the N receive state, simply change its receive state to Y after ignoring the first frame 48. Otherwise, if the second station copies the first frame 48 because it was in a Y receive state, it will notice that the first station had already copied the first frame 48. Accordingly, the second station will ignore the first frame 48 without changing its own receive state. In either case, after the passage of the first frame 48 through device 20, the second station will have a Y receive state.

A second frame 48 in the message will then be ignored by the first station and copied by the second station. Both stations will change their receive state with the passage of this second frame 48, and will continue to do so for the passage of all subsequent frames 48 which are properly addressed. In this way, the stations 28, 30 will effectively sequence their operation and substantially increase the bandwidth of data which can be received at the device 20 from the ring-topology networks 12, 14.

It can be appreciated by the skilled artisan that the modulus of the modulo counters which are respectively associated with the stations 28 and 30 of device 20 can be controlled by software in the host or network 18. To do this, the software needs to know the number of stations which are active at the station and be able to program each of the counters at the various stations 28, 30 with this information. In the event a station 28 or a station 30 becomes inoperative, the software of host or network 18 can reprogram the counters at the remaining operative stations. Thus, as long as at least one station is operative at a device 20, the host or network 18 can remain on-line with the ring-topology network 12, 14. The consequence is that through the concerted operation of a plurality of stations in accordance with the present invention, a catastrophic failure at any one device 20 can be avoided. Instead, the device 20 can continue to function, albeit at reduced bandwidth capacity, without the inoperative station.

While the particular device and system for attaching a host or network in data communication with a ring-topology network as herein shown and disclosed in detail is fully capable of obtaining the objects and providing the advantages herein before stated, it is to be understood that it is merely illustrative of the presently preferred embodiments of the invention and that no limitations are intended to the details of the construction or design herein shown other than as defined in the appended claims.

We claim:

1. A system for establishing data communication between a ring-topology network and a host network attached to the ring-topology network which comprises:
   a plurality of contiguous stations, each said station separately connected in data communications with said ring;
   means for separating said data into frames of data;
   means for setting each said station into either a positive receive state wherein said station will copy said frame, or a negative receive state wherein said station will not copy said frame;
   means for selectively copying said frames at each said station in repetitive cycles in accordance with a predetermined sequence;
   means for coordinating said predetermined sequence at each station for collectively receiving all said frames addressed to said host network through said plurality of stations; and
   a modulo counter included in each said station, said counter being operable to count one unit in response to the receipt of one said frame at said station, said counter is set to countdown from a number which is one less than the number of said contiguous stations.

2. A system as recited in claim 1 wherein said means for selectively copying said frames in a positive receive state is responsive to said counter.

3. A system as recited in claim 2 wherein said number of said stations is "n", and said predetermined sequence is established through said counter by placing said station in a negative receive state for the immediately following "n−1" said frames received after said station has copied one said frame.

4. A system as recited in claim 2 wherein said number of said stations is "n", and said predetermined sequence is established through said counter by changing said station from a negative receive state to a positive receive state for each $n^{th}$ frame received by said station.

5. A system as recited in claim 2 wherein said number of said stations is "n", and said counter further comprises means for resetting said counter to "n−1" after said station has copied said frame.

6. A system as recited in claim 2 wherein said means for coordinating said predetermined sequence at each said station further comprises a means for determining whether said frame has been previously copied by another said station, said station remaining in a positive receive state if said frame has been previously copied by another said station.

7. A device for attaching a ring-topology host network in data communications with a ring-topology network which comprises:
   a plurality of contiguous stations consecutively attached to said ring-topology network for sequentially receiving data from said ring-topology network;

means for separating said data into frames of data;

means for setting each said station into either a positive receive state wherein said station will copy said frames, or a negative receive state wherein said station will not copy said frames;

an address recognition means included in each said station for selectively copying said frames from said ring-topology network;

a control means included in each said station for coordinating the copying of frames by said station with the copying of other said frames by other said stations in said device in repetitive cycles;

means for transmitting all said frames copied by said plurality of stations of said device to said host network; and a modulo counter included in each said station, said counter being operable to count one unit in response to the receipt of one said frame at said station and said counter is set to count a number which is one less than the number of stations in said device and wherein said control means is responsive to said counter.

8. A device as recited in claim 7 wherein said number of stations in said device is "n", and said control means coordinates the copying of said frames through said counter by placing said station in a negative receive state for the immediately following "n−1" said frames received after said station has copied one said frame, and by changing said station from a negative receive state to a positive receive state for each $n^{th}$ frame received by said station, and said counter further comprises means for resetting said counter to "n−1" after said station has copied said frame.

9. A device as recited in claim 8 wherein said control means further comprises a means for determining whether said frame has been previously copied by another said station, said station remaining in a positive receive state if said frame has been previously copied by another said station.

10. A device for receiving frames of data at a host network from a ring-topology network which comprises:

a first station connected to said ring-topology network, said first station having means for selectively copying portions of data from said ring destined for said host network in accordance with a first predetermined sequence;

a second station connected to said ring-topology network, said second station having means for selectively copying portions of data from said ring destined for said host network in accordance with a second predetermined sequence, and means for alternating said first sequence of data with said second sequence of data;

said first and second stations each including a counter, said counter being operable to count one unit in response to the receipt of one said data frame at said station and said counter is set to count a number which is one less than the number of stations in said device.

11. A device as recited in claim 10 wherein said means for alternating said first sequence of data with said second sequence of data includes changing said station from a negative receive state to a positive receive state for every other frame received by said station.

12. A device as recited in claim 11 wherein said means for alternating said first sequence of data with said second sequence of data includes a decision action to maintain said station in a positive receive state if said frame has been previously copied by another said station in said device.

* * * * *